Figure 1:
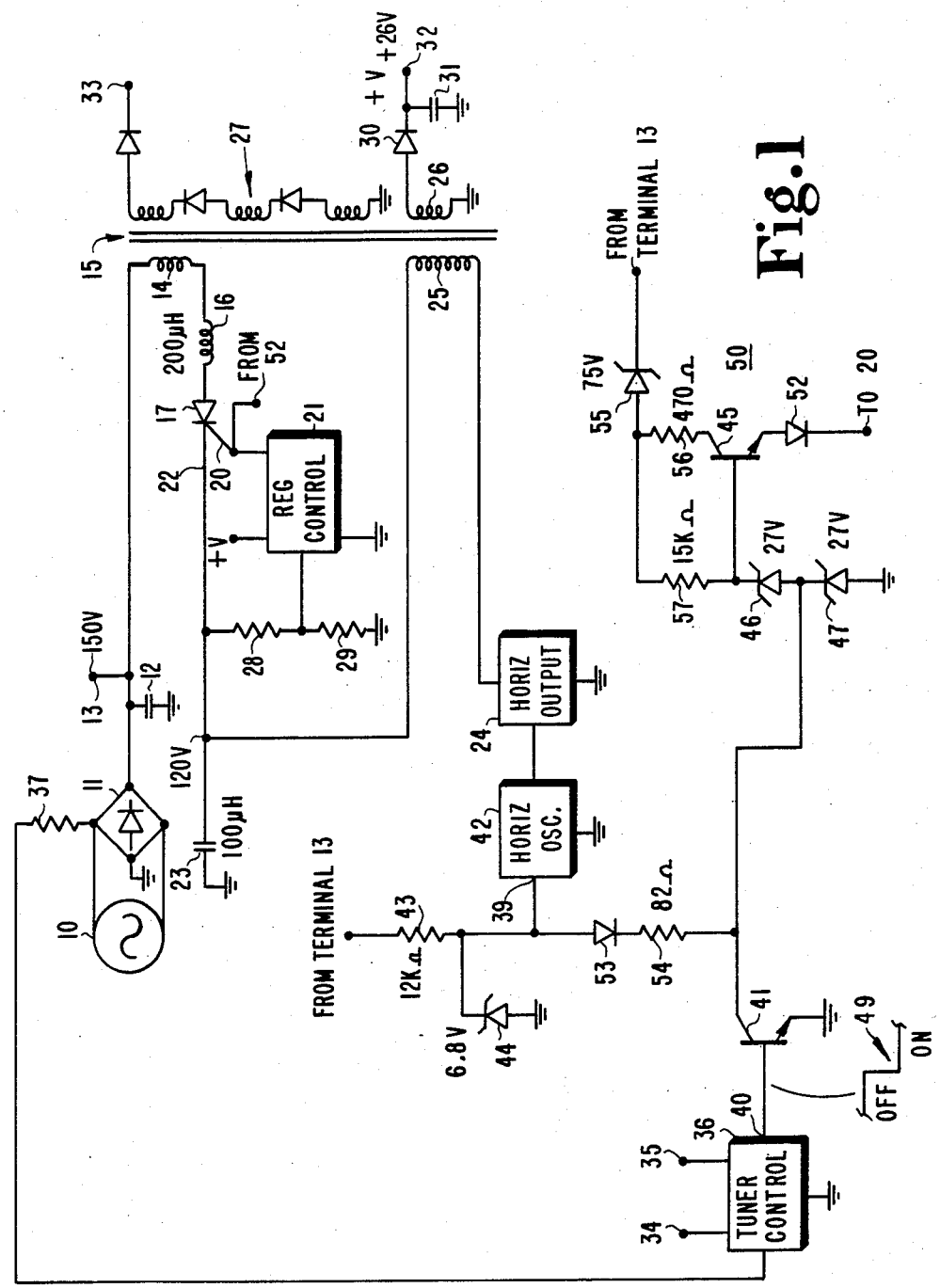

United States Patent [19]

Lee

[11] Patent Number: 4,656,573
[45] Date of Patent: Apr. 7, 1987

[54] POWER SUPPLY HAVING ON-OFF CONTROL

[75] Inventor: Mu S. Lee, Taipei, Taiwan

[73] Assignee: RCA Corporation, Princeton, N.J.

[21] Appl. No.: 862,027

[22] Filed: May 12, 1986

[51] Int. Cl.$^4$ .......................................... H02M 3/315
[52] U.S. Cl. .................................. 363/49; 315/411; 358/190
[58] Field of Search ................. 315/411; 358/190; 363/49, 21, 27, 28, 96, 135

[56] References Cited

U.S. PATENT DOCUMENTS

| | | | |
|---|---|---|---|
| 3,970,780 | 7/1976 | Minoura | 178/7.3 |
| 4,069,449 | 1/1978 | Farnsworth | 363/28 |
| 4,188,568 | 11/1980 | Manners | 315/411 |
| 4,188,641 | 11/1980 | Baker et al. | 358/190 |
| 4,207,516 | 6/1980 | Babcock | 363/49 X |
| 4,246,634 | 1/1981 | Purol | 363/49 |
| 4,277,824 | 7/1981 | Alberkrack | 363/49 |
| 4,385,264 | 5/1983 | Balaban et al. | 315/411 |
| 4,415,842 | 11/1983 | Kulka et al. | 358/190 X |
| 4,500,923 | 2/1985 | Duvall et al. | 358/190 |
| 4,559,592 | 12/1985 | Muller | 363/21 |

OTHER PUBLICATIONS

Schematic Diagram of RCA CTC 126/233 CTV Chassis.

Primary Examiner—Patrick R. Salce
Assistant Examiner—Marc S. Hoff
Attorney, Agent, or Firm—Paul J. Rasmussen; Joseph Laks; Scott J. Stevens

[57] ABSTRACT

A video display apparatus incorporates a start-up a control circuit that is responsive to a bilevel signal in dicative of the desired operating state of the video display apparatus. One state of the bilevel signal is effective to permit operation of the horizontal deflection circuitry and to generate a gating pulse for a voltage regulator circuit. The other state of the bilevel signal disables the horizontal deflection circuit which in turn disables the video display apparatus load circuits.

7 Claims, 1 Drawing Figure

POWER SUPPLY HAVING ON-OFF CONTROL

This invention relates to turn on and turn off control of video display apparatus.

A video display apparatus, such as a television receiver, includes various load circuits that are desirably turned on or off in a particular sequence or manner in order to improve the operating characteristics of the video display apparatus. The power supply voltages for the various load circuits may also require sequential disabling in order to insure that the associated load circuits are appropriately disabled. Initial energization or start-up of the video display apparatus may also require that particular load circuits begin operating sooner than other load circuits in order to provide proper start-up.

With a video display apparatus that incorporates remote control operation, the previously described procedures may become more complex, as power must be maintained to the remote control circuitry, yet be removed from the load circuits to permit the video display apparatus to be turned off.

In accordance with an aspect of the present invention, a power supply for a video display apparatus comprises a source of unregulated voltage and a regulator, incorporating a switch having an input terminal coupled to the unregulated voltage source. The switch has an output terminal and a control terminal responsive to an input signal for rendering the switch conductive. A capacitor is connected to the switch output terminal.

A start-up circuit is coupled to the switch control terminal and is responsive to an enabling signal for providing a temporary input signal to the control terminal for rendering the switch conductive in order to establish a voltage across the capacitor. Circuitry is responsive to the voltage across the capacitor for providing normal input signals to the control terminal. The start-up circuit is also responsive to the voltage across the capacitor for becoming disabled.

In the accompanying drawing,

The sole FIGURE is a block and schematic drawing of a portion of a video display apparatus incorporating a control circuit in accordance with an aspect of the present invention.

Referring to the FIGURE, a source of AC power, such as an AC line supply 10, provides an AC voltage that is rectified by a rectifying circuit 11 and filtered by a capacitor 12, to provide a source of unregulated DC voltage at a terminal 13. The unregulated DC voltage is also applied via a winding 14 of a transformer 15 and an input inductor 16 to the anode of a voltage regulating SCR 17. During normal operation of the video display apparatus, SCR 17 is rendered conductive by pulse width modulated input pulses applied to its gate terminal 20 from a conventional regulator control circuit 21. SCR 17 is commutated off in a conventional manner by transformer flyback pulses appearing across winding 14. The duration of the SCR input or gating pulses is controlled to provide a regulated DC voltage across a capacitor 23 at the cathode terminal 22 of SCR 17.

The regulated DC voltage is used to power a horizontal deflection output circuit 24, illustratively of the flyback type, which produces horizontal deflection rate flyback pulses that are applied across winding 25 of transformer 15. The flyback pulses cause a voltage to be developed across secondary windings 26 and 27 by transformer action. The voltage across winding 26 is rectified by a diode 30 and filtered by a capacitor 31 to provide a voltage designated +V at a terminal 32, which may be used to power various load circuits of the video display apparatus. In the FIGURE, the +V supply illustratively provides power to regulator control circuit 21. In order to control the conduction time of SCR 17, a feedback signal is developed across a voltage divider comprising resistor 28 and 29 from the regulated voltage at the cathode 22 of SCR 17 and applied to regulator control circuit 21. The voltage developed across winding 27 provides a high voltage level at a terminal 33 that is applied to the high voltage or ultor terminal of a cathode ray tube (not shown).

The video display apparatus shown in the FIGURE illustratively is responsive to an on/off signal from a remote control circuit (not shown) via a terminal 34 or from a switch (also not shown) located on the video display apparatus via a terminal 35. The on/off signal present at terminal 34 or terminal 35 is applied to a tuner control circuit 36. Tuner control circuit 36 receives operating power of the order of 10 volts from a terminal of rectifying circuit 11 via a resistor 37, which enables tuner control circuit 36 to remain enabled during a standby operating condition when the video display apparatus is turned off in order to respond to an "on" signal at terminal 34 from the remote control circuitry. Tuner control circuit 36 produces a bilevel signal at an output terminal 40. The logical state of the bilevel signal is indicative of the selected desired operating condition of the video display apparatus based on the signal received via terminals 34 or 35.

In accordance with a novel aspect of the present invention, the bilevel signal 49 at output terminal 40 of tuner control circuit 36 is applied to the base of a transistor 41. The "on" designating signal level illustratively has a low voltage level that causes transistor 41 to be nonconductive or cut off. With transistor 41 off, the voltage level at terminal 39 of horizontal oscillator 42 is sufficiently high that horizontal oscillator circuit 42 becomes energized via resistor 43 from the unregulated DC voltage present at terminal 13. Zener diode 44 acts as a regulating device to control the voltage level applied to horizontal oscillator circuit 42. When energized, horizontal oscillator circuit 42 produces horizontal deflection rate switching pulses that are applied to horizontal output circuit 24. Horizontal output circuit 24 thus generates horizontal deflection current for deflection of the electron beam of a cathode ray tube (not shown). The flyback pulses which appear across winding 25 are produced during the horizontal deflection flyback period and, as previously described, act to produce the load circuit supply voltages, such as the +V supply at terminal 32 and the high voltage supply at terminal 33.

A low "on" signal level at terminal 40, which cut off or renders transistor 41 nonconductive, allows the base voltage of transistor 45, established by the combination of zener diodes 46 and 47, to rise to approximately 54 volts. Zener diode 47 additionally limits the collector voltage of transistor 41 in order to protect transistor 41. Transistor 45, part of a start-up circuit 50, has its collector coupled to the unregulated voltage source at terminal 13 via a zener diode 55 and a resistor 56. A resistor 57 is coupled between zener diode 55 and the base of transistor 45 and supplies base current to transistor 45 from terminal 13 via zener diode 55. When the base voltage rises due to transistor 41 being turned off, transistor 45 is rendered conductive, and as a result the emitter voltage of transistor 45 increases. The emitter of transistor 45 is coupled to the gate terminal 20 of SCR 17 via a diode 52, so that when transistor 45 becomes conductive, a gating signal is produced and SCR 17 is triggered and gated into conduction. Capacitor 23 begins to charge, which establishes an operating voltage for horizontal output circuit 24. As a result of the operation of horizontal output circuit 24, flyback pulses are produced, so that load circuit supply voltage levels are established. As a result, the various load circuits of the video display apparatus begin normal operation. As long as transistor 45 is rendered conductive, SCR 17 will continue to be triggered, and capacitor 23 will continue to charge, thereby raising the cathode voltage of SCR 17. As the SCR cathode voltage increases, the gate voltage will also increase. Zener diode 55, having an avalanche voltage of the order of 75 volts, provides a voltage level at the collector of transistor 45 below that of the regulated voltage at the cathode of SCR 17. The presence of zener diode 55 insures that the voltage at terminal 20 will eventually be sufficient to reverse bias diode 52 and cause transistor 45 to become nonconductive. Transistor 45 no longer acts to trigger SCR 17 by the production of a temporary or start-up gating signal; however, the establishment of the load circuit voltage supplies provides the +V voltage at terminal 32 to power regulator control circuit 21. Regulator control circuit 21 in turn generates the normal gating signal or pulses for SCR 17 in order to produce the regulated voltage level across capacitor 23, i.e., at the cathode of SCR 17. Transistor 45 therefore enables the start-up of the regulator circuit by causing SCR 17 to be gated into conduction for a period of time sufficient to allow the load circuit supply voltages to reach substantially normal operating levels such that the regulator control circuitry begins operating in its normal manner. Thereafter transistor 45 becomes nonconductive and ceases to influence the operation of the video display apparatus. Resistor 57 limits the current flow through zener diodes 46 and 47, and through transistor 41 when transistor 45 is turned off.

Upon a video display apparatus "off" signal present at terminals 34 or 35, tuner control circuit 36 produces a high level output signal at terminal 40 that is applied to the base of transistor 41 and causes transistor 41 to become conductive. Transistor 41 then conducts current from terminal 13 to ground via a diode 53, which act to decrease the voltage at terminal 39 of horizontal oscillator 42, and a current limiting resistor 54. The voltage level at terminal 39 of horizontal oscillator 42 decreases to a level insufficient to power horizontal oscillator 42. Horizontal oscillator 42 therefore becomes disabled and no longer produces switching pulses for horizontal output circuit 24. Consequently, horizontal output circuit 24 ceases to generate flyback pulses and as a result the voltage levels of the load circuit supplies decrease. With the horizontal output circuit 24 disabled, insufficient current is drawn via SCR 17 to maintain conduction and therefore SCR 17 becomes disabled. The voltage across capacitor 23 also decreases. This results in the video display apparatus becoming disabled or turned off. The unregulated voltage is still present at terminal 13, however, to provide standby power to tuner control circuit 36 for remote control operation. The base voltage of transistor 45 is also decreased due to shunting of zener diode 47 by way of conduction of transistor 41, so that transistor 45 does not attempt to gate SCR 17 into conduction while the video display apparatus is turned off.

The novel circuit shown in the FIGURE therefore provides reliable start-up of the video display apparatus by controlling both the start-up of the flyback pulse generating horizontal deflection circuitry and the voltage regulating circuitry. Turn-off of the video display apparatus is also effective to maintain the presence of standby power for remote control operation while disabling the load circuits to prevent the video display apparatus from operating.

What is claimed is:
1. A power supply for a video display apparatus comprising:
    a source of unregulated voltage;
    regulator means incorporating a controllable switch means having an input terminal coupled to said source of unregulated voltage, an output terminal and a control terminal responsive to an input signal for rendering said switch means conductive;
    a capacitor coupled to said switch means output terminal;
    start-up means coupled to said switch means control terminal and responsive to a selectable video display apparatus enabling signal for applying a temporary input signal to said control terminal for rendering said switch means conductive such that a voltage is established across said capacitor; and
    means responsive to said voltage across said capacitor for applying normal input signals to said control terminal, said start-up means being responsive to said voltage across said capacitor for becoming disabled.
2. The arrangement defined in claim 1, wherein said controllable switch means comprises an SCR.
3. The arrangement defined in claim 1, wherein said start-up means comprises a transistor, said transistor being rendered conductive in response to said selectable video display apparatus enabling signal for conducting current to said switch means control terminal.
4. A power supply for a video display apparatus comprising:
    a source of unregulated voltage;
    an SCR having a first terminal coupled to said source of unregulated voltage, a second terminal and a gate terminal;
    a capacitor coupled to said second terminal of said SCR;
    a start-up circuit coupled to said gate terminal of said SCR comprising:
        means responsive to video display apparatus enabling signal for providing an output signal;
        means incorporating a switch for applying said output signal to said gate terminal of said SCR for causing conduction of said SCR such that the voltage across said capacitor increases;
        circuit means responsive to the voltage developed across said capacitor for generating a first supply voltage;
        regulator control means responsive to said first supply voltage for providing a gating signal to said gate terminal of said SCR for controlling the conduction of said SCR for maintaining said voltage across said capacitor at a predetermined level, said predetermined level sufficient to cause said switch to change conduction states in order to disable said output signal generating means of said start-up circuit.

5. The arrangement defined in claim 4, wherein said means for providing said output signal comprises a transistor having its conduction state controlled in response to said video display apparatus enabling signal.

6. The arrangement defined in claim 4, wherein said switch comprises a transistor rendered conductive in response to said output signal for conducting current to said gate terminal of said SCR.

7. The arrangement defined in claim 4, wherein said predetermined voltage across said capacitor is sufficient to render said switch nonconductive even in the presence of said output signal.

* * * * *